US009727802B2

(12) United States Patent
Wang et al.

(10) Patent No.: US 9,727,802 B2
(45) Date of Patent: Aug. 8, 2017

(54) AUTOMATIC, COMPUTER-BASED DETECTION OF TRIANGULAR COMPOSITIONS IN DIGITAL PHOTOGRAPHIC IMAGES

(71) Applicant: The Penn State Research Foundation, University Park, PA (US)

(72) Inventors: James Z. Wang, State College, PA (US); Siqiong He, Mountain View, CA (US)

(73) Assignee: The Penn State Research Foundation, University Park, PA (US)

( * ) Notice: Subject to any disclaimer, the term of this patent is extended or adjusted under 35 U.S.C. 154(b) by 13 days.

(21) Appl. No.: 14/921,482

(22) Filed: Oct. 23, 2015

(65) Prior Publication Data

US 2016/0117834 A1 Apr. 28, 2016

Related U.S. Application Data

(60) Provisional application No. 62/067,580, filed on Oct. 23, 2014.

(51) Int. Cl.
| | | |
|---|---|---|
| *G06K 9/34* | (2006.01) | |
| *G06K 9/62* | (2006.01) | |
| *G06K 9/46* | (2006.01) | |
| *G06T 7/13* | (2017.01) | |

(52) U.S. Cl.
CPC ......... *G06K 9/6202* (2013.01); *G06K 9/4604* (2013.01); *G06T 7/13* (2017.01)

(58) Field of Classification Search
None
See application file for complete search history.

(56) References Cited

U.S. PATENT DOCUMENTS

| | | | | |
|---|---|---|---|---|
| 7,660,465 | B2 * | 2/2010 | Yamaguchi | G06K 9/4604 |
| | | | | 382/181 |
| 8,055,047 | B2 * | 11/2011 | Sundaram | G06K 9/00201 |
| | | | | 382/128 |
| 8,237,709 | B2 * | 8/2012 | Dorbie | G06T 17/20 |
| | | | | 345/423 |
| 2006/0056732 | A1 * | 3/2006 | Holmes | G06T 7/0006 |
| | | | | 382/286 |

(Continued)

OTHER PUBLICATIONS

Arbelaez et al., "Contour detection and hierarchical image segmentation", Pattern Analysis and Machine Intelligence, IEEE Transactions on, 33(5):898-916, 2011.*

(Continued)

*Primary Examiner* — Feng Niu
(74) *Attorney, Agent, or Firm* — Dinsmore & Shohl LLP

(57) ABSTRACT

An intelligent system detects triangles in digital photographic images, including portrait photography. The method extracts a set of filtered line segments as candidate triangle sides and/or objects as candidate triangle vertices. A modified RANSAC algorithm is utilized to fit triangles onto the set of line segments and/or vertices. Two metrics may then be used evaluate the fitted triangles. Those with high fitting scores are considered as detected triangles. The system can accurately locate preeminent triangles in photographs without any knowledge about the camera parameters or lens choices. The invention can also help amateurs gain a deeper understanding and inspirations from professional photographic works.

18 Claims, 7 Drawing Sheets

(56) References Cited

U.S. PATENT DOCUMENTS

| | | | | |
|---|---|---|---|---|
| 2006/0204079 | A1* | 9/2006 | Yamaguchi | G06K 9/4604 382/154 |
| 2008/0205749 | A1* | 8/2008 | Sundaram | G06K 9/00201 382/154 |
| 2009/0073166 | A1* | 3/2009 | Dorbie | G06T 17/20 345/420 |
| 2013/0326417 | A1* | 12/2013 | Sun | G06K 9/468 715/835 |

OTHER PUBLICATIONS

Bhattacharya, S. et al., A framework for photo-quality assessment and enhancement based on visual aesthetics, *Proceedings of the international conference on Multimedia*, pp. 271-280, 2010.

Datta, R. et al., Studying aesthetics in photographic images using a computational approach, *Computer Vision—ECCV* 2006, pp. 288-301, 2006.

Datta, R. et al., Learning the consensus on visual quality for next-generation image management, *Proceedings of the 15th international conference on multimedia*, pp. 533-536, ACM, 2007.

Datta, R. et al., Algorithmic inferencing of aesthetics and emotion in natural images: An exposition, *Image Processing, 2008, ICIP 2008, 15th IEEE International Conference*, pp. 105-108, IEEE, 2008.

Datta, R. et al., Acquine: aesthetic quality inference engine-real-time automatic rating of photo aesthetics, *Proceedings of the international conference on Multimedia information retrieval*, pp. 421-424, 2010.

Dhar, S. et al., High level describable attributes for predicting aesthetics and interestingness, *Computer Vision and Pattern Recognition (CVPR), 2011 IEEE Conference*, pp. 1657-1664, 2011.

Jin, X. et al., Learning artistic lighting template from portrait photographs, *Computer Vision—ECCV* 2010, pp. 101-114, 2010.

Luo, W. et al., Content-based photo quality assessment, *Computer Vision (ICCV), 2011 IEEE International Conference*, pp. 2206-2213, 2011.

Luo, Y. et al. Photo and video quality evaluation: Focusing on the subject, *Computer Vision—ECCV* 2008, pp. 386-399, 2008.

Obrador, P. et al., The role of image composition in image aesthetics, *Image Processing (ICIP) 2010 17th IEEE International Conference*, pp. 3185-3188, 2010.

Zhang, Y. et al., Aesthetic composition representation for portrait photographing recommendation, Image Processing (ICIP), *2012 19th IEEE International Conference*, pp. 2753-2756, 2012.

\* cited by examiner

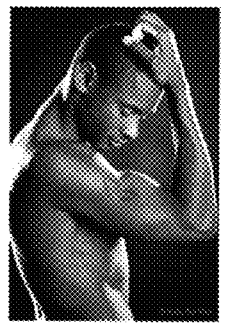
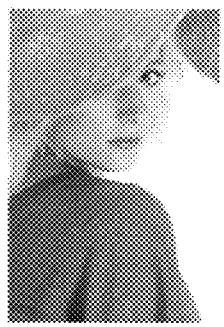
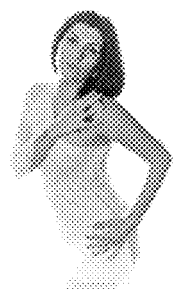
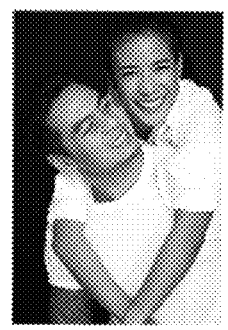
FIG – 1A  FIG – 1B  FIG – 1C  FIG – 1D
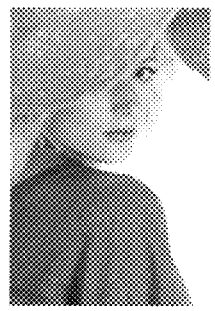
FIG – 2A
original image
FIG – 2B
density=0.7
FIG – 2C
density=0.5
FIG – 2D
density=0.2 original image

Contour

LSD result filtered LSD($\alpha = 0.5$)

filtered LSD($\alpha = 0.7$)

Outliers – irrelevant objects

Outliers – multiple triangles

Imperfect sides: occlusion

Imperfect sides: bending curve

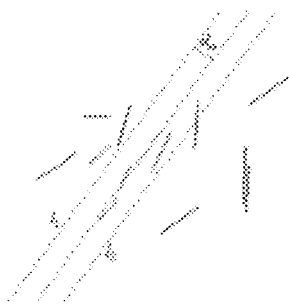
FIG – 5A neighborhood region
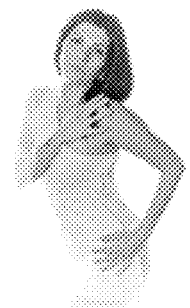
FIG – 5B original image
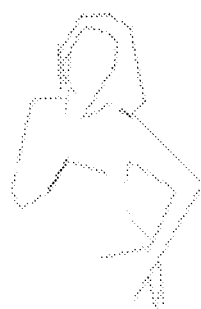
FIG – 5C candidate sides
FIG – 5D fitted pixels

AUTOMATIC, COMPUTER-BASED DETECTION OF TRIANGULAR COMPOSITIONS IN DIGITAL PHOTOGRAPHIC IMAGES

REFERENCE TO RELATED APPLICATION

This application claims priority from U.S. Provisional Patent Application Ser. No. 62/067,580, filed Oct. 23, 2014, the entire content of which is incorporated herein by reference.

FIELD OF THE INVENTION

This invention relates generally to digital photograph analysis and, in particular, to a system and method for recognizing and extracting triangular compositions in all type of digital images including portraits.

BACKGROUND OF THE INVENTION

Recently, computationally understanding and evaluating the aesthetic quality of visual displays such as photos have drawn much attention from domains like computer vision and image understanding [9, 4, 5, 6]. Thanks to the widespread use of digital cameras and easy-to-connect Internet, ordinary people can now easily take photos and quickly upload them online. On one hand, this promotes the creation of many excellent photographic works. On the other hand, it leads to an explosively growing volume of digital images among which a significant portion are of low quality. It is apparent that when people can easily take photos with little cost, they become less cautious and do not think thoroughly before clicking the shutter.

Computationally understanding the aesthetics in images motivates a variety of useful applications. For instance, low-quality images can be filtered out automatically and efficiently so we can easily access high-quality images. Such techniques can also recommend exemplar photography works to amateurs, provide hints to gain a deeper understanding of aesthetics, and inspire them to take more aesthetically appealing photographs.

Several important elements, such as color, exposure, depth-of-field, and composition, etc., are believed to be the key of great photography. Researchers design specific visual features to describe different elements of a photograph. One of the earliest work by Datta et al. [3] characterizes Colorfulness of photos and purity of these colors. Similarly, Ke [10] and Su [18] utilizes color histogram to represent the color palette used by a photo. Furthermore, Simplicity [10, 13] and Contrast [7] of color are also taken into account in aesthetic quality assessment. More work studies how to combine distinct colors together to generate a more harmonious view [13, 12, 17, 14].

Aside from color, the use of light can also be a determinant for the aesthetic quality of photographs, especially portraits. Good lighting can dramatically improve the quality of a photo [8]. Datta et al. [3] use the average pixel intensity to characterize the use of light in photography. Ke et al. [10] and Luo et al. [13] both point out that when the brightness of the subject area is significantly different than that of foreground area, this gives rise to a more pleasing look. Dhar et al. [7] focused their study on outdoor images. To differentiate natural outdoor illumination, they introduced in three attributes: clear skies, cloudy skies, and sunset skies. Recognizing the importance of lighting condition in human portraits, Luo et al. [12] designed several lighting features such as the ratio of face areas, the average lighting of faces, the ratio of shadow areas, and the face clarity to assess the quality of human portraits.

Low depth-of-field (low DoF) techniques capture objects within a small range of depths in sharp focus while objects at other depths are blurred. This is usually used to emphasize the subject. Researchers have attempted to include the feature of low DoF in their work to identify high-quality photographs. Datta et al. [3, 8, 17] utilized wavelet-based texture to measure the graininess or smoothness in a photo. Ke et al. [10] computed the spatial distribution of high frequency edges of an image to try to capture the blur of the background. Dhar et al. [7] employed Daubechies wavelet based features to indicate the blurring amount over the photo. Luo et al. [12] extracted different types of subjects with different approaches such as picking out clear object in low DoF photo or detecting humans in portrait photo. They then measured the clarity of the subject area and treated it as one factor which would influence the aesthetic quality of photographs.

Compared to the above elements, modeling composition of a photo is more challenging because it requires understanding semantic information. User studies indicate that composition is the most important feature related to the aesthetic quality of a photo [15, 16]. In photography, composition is the arrangement of visual elements in the scene. Good composition highlights the object of interest in a photo to immediately capture attention.

Generally, viewers prefer simple and clear compositions. Hence, early work proposed high-level composition features based on locations and orientations of long dominant lines in images [12] to capture the simplicity of the composition. A more intelligent way to describe composition is to model popular composition rules such as the rule of thirds and the rule of golden ratio. The rule of thirds divides the photo evenly with two vertical lines and two horizontal lines, resulting in four intersection points. Studies in photography show that people's first glances always fall at the four intersections other than the center of the photo.

Researchers design features to model compositions following the rule of thirds [3, 17, 13, 7]. The rule of 'golden ratio' demonstrates that the position of horizon line in scenic photos should be adjusted to satisfy the golden ratio. The golden ratio is always considered as the most beautiful ratio. Bhattacharya et al. [2] enhance the quality of amateurish photos by adjusting their compositions to follow the rule of golden ratio. Su et al. [18] proposed another novel method to represent different types of photograph compositions. They evenly divided the photo into N×N patches where N equals to $\{2, 3, 6\}$ based on which different patterns of foreground/background area were predefined. Zhang's paper [21] automatically recommended suitable positions and poses of people in the scene of portrait photography.

All these composition rules can be used to model simple situations. However, due to the complexity of real scene, photographers need to consider a higher level of aesthetic principle on composition. In pictorial art, good composition is considered as a congruity or agreement exists among the elements in a design [11]. The design elements seem to belong together as if there are some implicit visual connections between them.

Another term to describe this kind of unity is harmony. By reflecting this principle in photography, subjects in one scene should not aimlessly scatter around. Instead, they should unify together. To convey such unity in their photos, professional photographers have designed dozens of executable techniques for composition. One universal and interesting technique is to embed basic geometrical shapes in photographic compositions [19] (e.g., FIG. 1). Human beings begin to learn about basic geometrical shapes such as circles, rectangles, and triangles since very young. Human eyes are trained to recognize those shapes immediately. Therefore, Valenzuela [19] suggested that we can explicitly or implicitly embed basic geometrical shapes in photos to attract viewers. Moreover, since these shapes are immediately recognized, subjects bounded within such shapes or implicitly constructing such shapes are perceived as a unity.

Among all basic geometrical shapes, the triangle is arguably the most popular shape utilized by professional photographers to make a composition more interesting. Such compositional technique is called "the triangle technique." There are also numerous examples associated with the use of triangles in visual art and architecture works.

Two fundamental questions need to be addressed when analyzing the compositions of a portrait photograph: where are the human subjects located within the scene and how do they pose? The rule of thirds has answered the first question by suggesting that positioning the human subjects near ⅓ of the scene is more appealing than in the center. Therefore, the location of human subjects can be easily modeled and assessed with multiple state-of-the-art methods based on rule of thirds. Nevertheless, the second question remains a challenge.

SUMMARY OF THE INVENTION

This invention involves detecting the usage of the triangle technique in two common types of photographs: natural scenes and portraits. We propose an automated system that can accurately locate a variety of triangles, even those that are carefully designed by professional photographers but difficult to be recognized by amateurs. By detecting the usage of the triangle technique, we can model a variety of composition types and retrieve images based on similarity or dissimilarity in composition. We can also help amateur photographers gain a deeper understanding from professional works, and inspire them to generate photographs with more interesting composition and higher aesthetic quality.

In this disclosure, we explore how triangle techniques can be leveraged in designing poses for human subjects. Detecting triangles embedded in human poses is a different research problem from purely detecting human poses for two reasons. First, detecting human poses aims at pictures where human beings stand right in front of the camera with little occlusion, whereas triangles can be embedded in all kinds of poses where people can show their front, profile, or even back. Besides, severe occlusion may exist in studio portrait (FIG. 4C). Second, detection of human poses focuses on human subjects, and thus most of prior approaches are based on human body/upper body detection algorithms. In contrast, triangle techniques can construct triangles with not only body parts but also apparels and other objects in the environment such as chairs, lamps, etc. (FIG. 4B). Professional photographers employ triangle techniques to group human subjects and the environment as a whole, making the scene more coherent and interesting.

Despite the popularity of triangle techniques in portrait photography, recognizing such triangles is often difficult for less experienced amateurs because most triangles do not have explicit edges, and sometimes they are even constructed with different types of objects. Moreover, triangles in portraits can be of various sizes, shapes, orientations, and appearances. Hence, one goal is to automatically detect potential triangles from professional photographers' work in order to help amateurs recognize them and learn more from the usage of triangle techniques.

BRIEF DESCRIPTION OF THE DRAWINGS

FIG. 1A is an example of a photographic composition;
FIG. 1B is a different photographic composition;
FIG. 1C is a further photographic composition;
FIG. 1D is an alternative photographic composition;
FIG. 2A shows the original photographic image of FIG. 1B;
FIG. 2B shows the result of the line segment detector using FIG. 1B with a density of 0.7;
FIG. 2C shows the result of the line segment detector using FIG. 1B with a density of 0.5;
FIG. 2D shows the result of the line segment detector using FIG. 1B with a density of 0.2;
FIG. 5A shows neighborhood regions;
FIG. 5B is the original image of FIG. 1C;
FIG. 5C illustrates candidate sides associated with the original image of FIG. 5B;
FIG. 5D illustrates fitted pixels associated with the original image of FIG. 5B.

DETAILED DESCRIPTION OF THE INVENTION

Figure 3A:
FIG. 3A illustrates an original image.
Figure 3B:
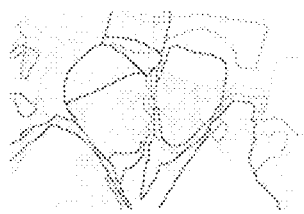
FIG. 3B depicts a contour extraction of the original image of FIG. 3A.
Figure 3C:
FIG. 3C shows the results of a Line Segment Detector (LSD) for FIG. 3B.
Figure 3D:
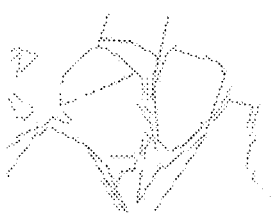
FIG. 3D illustrates a filtered LSD with $\alpha=0.5$.
Figure 3E:
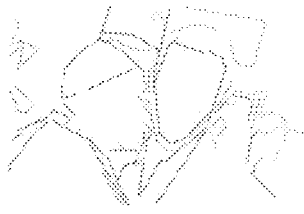
FIG. 3E illustrates a filtered LSD with $\alpha=0.7$.

Our system/method can be divided into two aspects: 1). A line segment detection module first extracts potential line segments from photographs using both local gradient and global contour information. The local gradient approach helps to extract all existing edge segments within the image such as boundaries of arms and apparels. Further, global contour information is utilized to filter out less significant segments. 2). The identified segments are then fed into a triangle fitting module as candidate triangle sides. A RANSAC algorithm is developed to randomly pick two sides from all the candidates and fit triangles onto the two sides. Two metrics, Continuity Ratio and Total Ratio, are defined to evaluate the fitness of these triangles. Triangles with high-level fitness are shown to users.

Detecting triangles in portrait photographs is a very challenging task on account of triangles' variability in size, shape, and orientation. Without identifying the size, shape and orientation of a triangle, it is almost impossible to detect it by exploring the entire search space of all triangle instances. To simplify the problem, we propose a sketch-based triangle detection framework. The framework contains three main modules: a query module, a line segment detecting module, and an angle fitting module.

Line Segment Detection

By examining high-quality portraits designed with the triangle technique (e.g., see FIGS. 1A-1D), we observe that triangles present in portrait photographs are often composed with parts of contours or edges, such as the contours of arms, body parts, wearing apparel, as well as edges formed by multiple human subjects. In general, a triangle is geometrically defined as a polygon with three corners and three sides, where the three sides are all straight line segments. However, contours of natural objects like humans or hats are often slightly curved. Therefore, to detect potential triangles in real images, our method needs to be able to identify such slightly curved line segments, in addition to straight edges, in an image.

To this end, we employ the Line Segment Detector (LSD) proposed by Gioi et al. [20] to convert gradient map of an image to a set of line segments. The line segment detector works as follows. It first calculates a level-line angle at each pixel to produce a level-line field. The level line is a straight line perpendicular to the gradient at each pixel. Then, the image is partitioned into line-support regions by grouping connected pixels that share the same angle up to a certain tolerance. Each line-support region is treated as a candidate line segment. Next, a hypothesis testing framework is developed to test each line segment candidate. The framework approximates each line support region with a rectangle and compares the number of "aligned points" in each rectangle in the original image with the expected number of aligned points in a random image. A line segment is detected if the actual number of aligned points in a rectangle is significantly larger than the expected number.

A nice property of LSD is that, by approximating the line-support region using a rectangle of a certain length, it is able to detect near-straight curves in the image. Further, it is straightforward in that a larger rectangle with more unaligned points will be needed to cover a more curved line segment. Therefore, by setting a threshold on the density of a rectangle, which is defined as the proportion of aligned points in the rectangle, we can control the degree up to which a curved line segment is considered. FIGS. 2A-2D show results of the line segment detector with different density values. The density is empirically set to 0.2 in our experiments.

While the line segment detector aims at extracting all potential line segments from an image using local image gradient cues, we notice that some line segments are more globally distinguishable and thus more visually attractive to viewers than others. To further identify such line segments, we combine the line segment detector with the Ultrametric Contour Map obtained by the state-of-the-art image segmentation algorithm [1]. The contour map has the same size as the original image. Each pixel on the map holds a confidence level between 0 and 1, indicating the possibility of it being on a boundary. Therefore, given a line segment, we identify all the pixels falling in its support region and consider the maximum confidence level of all pixels as the confidence level of the line segment. Finally, line segments with confidence levels under a certain threshold are removed. We choose the threshold based on the maximum confidence level present in an image. Specifically, assume the maximum confidence level of all the line segments in an image is C, where $C \in [0, 1]$, then we set the threshold as $(1-\alpha)C$ and accept line segments whose confidence levels are within the range $[(1-\alpha)C; C]$. The parameter controls the number of accepted line segments. Smaller filters remove more line segments from an image, as shown in FIGS. 3A-3E.

Detecting Triangles

The line segment detector described above gives us a set of candidate triangle sides. Randomly selecting three non-parallel sides from the set generates a triangle. Therefore, the problem of detecting a triangle can be converted into finding three nonparallel sides. However, although a triangle consists of three sides, we observe that a triangle can be uniquely determined as long as two sides are found, because the third side can be obtained by connecting the end points of the other two sides. Moreover, the presence of the third side is not as important in the practical usage of triangle technique because viewers can easily "complete" the geometric shapes themselves. As a result, our problem is reduced to fitting a triangle using two non-parallel line segments selected from the candidate set.

Figure 4A:
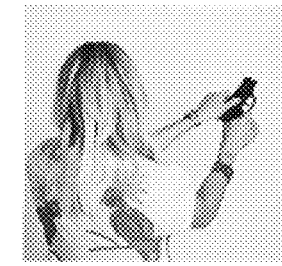
FIG. 4A presents an example of outliers or irrelevant objects.
Figure 4B:
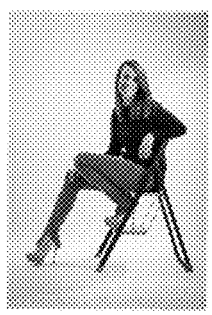
FIG. 4B shows multiple outlier triangles.

Two major challenges still exist in fitting triangles using the extracted line segments: 1) there is a large number of outlying line segments; and 2) the sides of a triangle are imperfect in real images. For example, as shown in FIG. 4A, some objects in a photograph are irrelevant to the use of triangle technique, even though they have high-contrast contours (e.g., the bird pattern on the woman's shirt). The line segments produced by such objects are all outliers. In addition, multiple triangles often exist in one image (e.g. FIG. 4B). Thus, line segments from different triangles should also be considered as outliers with respect to each other.

Figure 4C:
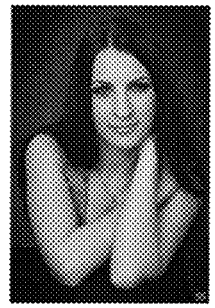
FIG. 4C depicts imperfect sides or 'occlusion'.
Figure 4D:
FIG. 4D depicts imperfect sides or 'bending curves.

In FIGS. 4C and 4D, we further show some examples of imperfect triangle sides. As one can see, these sides may be broken into several parts because of occlusion or artificial effect introduced by the line segment detector. For instance, the girl in FIG. 4C has her right arm occluded by her left arm. As a result, the contour of her right arm is broken into two line segments. In FIG. 4D, the contour of the back of the human subject is too curved to be approximated by a single straight line. Therefore, the line segment detector approximates it using two straight line segments with slightly different orientations.

In order to address these two challenges, we employ a modified RANSAC (RANdom SAmple Consensus) algorithm in favor of its insensitivity to outliers. RANSAC is an iterative method that robustly fits a set of observed data points (including outliers) to a pre-defined model. Our modified RANSAC algorithm includes three steps: 1) Two non-parallel line segments are randomly selected from the candidate set and extended to generate two lines on which the two triangle sides lie. 2) All the candidate line segments within neighborhoods of the two lines are projected onto the correspond lines, resulting in a number of projected pixels. Triangle sides are then constructed from all the projected pixels. 3) Once two triangle sides are constructed, two metrics Continuity Ratio and Total Ratio are calculated to measure the fitness and significance of the triangle, respectively. Triangles with high scores are accepted.

Below we describe each step in detail.

1) Identifying Sides From Line Segments: By extending the two randomly selected line segments to two lines, we determine the shared end point of the two sides, which is the intersection of the lines. Moreover, two intersecting lines generate four different angles with four different opening directions: upwards, downwards, leftwards, and rightwards. Each angle corresponds to a category of possible triangles that contain this angle and two sides of varied lengths. Given one of the four angles, once the lengths of its two sides are determined, a unique triangle can be constructed.

2) Fitting All Segments on Sides: In this step, we first mark all line segments within neighborhood of the two straight lines as inliers and those falling outside neighborhood as outliers. The neighborhood region of a straight line l:ax+by+c=0 is defined to be $$N(l) = \left\{ (x, y) | (x, y) \in R^2 \text{ and } \frac{|ax + by + c|}{\sqrt{a^2 + b^2}} \leq d_{nb} \right\},$$

i.e., the group of pixels whose distances to the straight line are smaller than a certain threshold $d_{nb}$. Then, all the inlier line segments with respect to line 1 can be calculated as I(l)=S∩N(l) where S is the set of all candidate line segments. Note that, if a line segment is cut into two parts by the neighborhood boundary, the part of line segment falling within the neighborhood is included as an inlier, whereas the other part is considered as an outlier. In FIG. 5A, we illustrate how the neighborhood of a straight line is utilized to partition all the line segments into inliers and outliers. The brown line segment is selected from the candidate line segment set and extended to a straight line l. Lines $l_1$ and $l_2$ designate boundaries of the neighborhood region. Both of them have a distance $d_{nb}$ from l. The red line segments and black line segments represent the inliers and outliers, respectively.

Next, all the pixels on the inlier line segments are projected onto the straight line. A pixel on the straight line is called a projected pixel if there is at least one pixel on any inlier line segment which is projected to this pixel. We denote the set of all projected pixels as:

$$P(l) = \{(x', y') \in l | \exists (x, y) \in I(l) \text{ and } (x-x', y-y') \perp l\}$$

FIGS. 5A-5D illustrates the fitting process. FIG. 5C shows all the line segments extracted from the image shown in FIG. 5B. The two line segments colored in blue are randomly selected from the candidate set. Subsequently, two straight lines, l and $\tilde{l}$, are generated by expanding the two line segments and their neighborhood regions are identified. Finally, inliers within their neighborhoods are projected onto the straight lines, as shown in FIG. 5D.

Here, we note that the projected pixels typically scatter along the entire straight line. However, a triangle is formed by two half lines determined by the intersection point. Therefore, when evaluating the fit of a triangle, we only consider the subsets of projected pixels which are on the two half lines, denoted as P($l^h$) and P($\tilde{l}^h$), as opposed to the entire sets of projected pixels P(l) and P($\tilde{l}$).

3) Evaluating the Fitted Triangle: In order to evaluate the quality of a fitted triangle, we define two scores: Continuity Ratio and Total Ratio:

$$C(l^h, \tilde{l}^h) = \frac{|P(l^h)|}{maxLen(l^h)} \times \frac{|P(\tilde{l}^h)|}{maxLen(\tilde{l}^h)},$$

-continued $$T(l^h, \tilde{l}^h) = \sqrt{\frac{maxLen(l^h) \times maxLen(\tilde{l}^h) \times \sin(\theta)}{2 \times \omega \times h}}$$

where ($x_0$, $y_0$) is the intersection point, and $$maxLen(l^h) = \max_{(x,y) \in P(l^h)} \sqrt{((x-x_0)^2 + (y-y_0)^2)}$$

In addition, ω and h are the width and height of the image, respectively, and θ is the angle between $l^h$ and $\tilde{l}^h$.

Specifically, the Continuity Ratio is defined as the product of the number of projected pixels along each side divided by the distance from the intersection point to the farthest projected pixel. This score describes how well the extracted line segments fit the given side. Meanwhile, the Total Ratio represents the significance of a fitted triangle, as it is defined as the square root of the area of the triangle divided by the square root of the area of the image. As a bigger triangle can be more easily recognized and has more impact on composition of the entire image, we only keep the triangles whose Continuity Ratio and Total Ratio scores are both above certain thresholds.

EXAMPLE

To help amateur photographers and to evaluate the performance of our triangle detection system, we constructed a dataset by collecting 4000 professional photographs from Flickr. We use the key word "studio portrait" for search because studio portraits are often taken by professional photographers who can use the triangle techniques skillfully and embed various triangles in their works. Four examples of portrait photographs which use triangle techniques are shown in FIGS. 1A-1D.

FIGS. 6A-6L present detected triangles with different continuity ratios and total ratios. "CR" stands for "Continuity Ratio" and "TR" stands for "Total Ratio". The thresholds for both ratios are empirically set to 0.25. As one can see, triangles with high continuity ratios are more easily recognized than those with low continuity ratios. However, many triangles are embedded in one image, and some of them can be easily overlooked by amateurs. Our goal here is to identify all potential triangles from images, which enables amateur photographers to better understand the triangle techniques.

Figures 6A, 6Y:
FIGS. 6A-6Y show detected triangles with different continuity ratios.

FIGS. 6A-6Y present detected triangles with different continuity ratios. We empirically set the thresholds as 0.7 for Continuity Ratio and 0.05 for Total Ratio. Specifically, given a fitted line segment, if more than >30% of its points are missing, we will remove it from the final detected results. As a result, the continuity ratio for a whole triangle (including two sides) is above 0.7*0.7=0.49. The threshold 0.05 for total ratios means that triangles with areas smaller than >5% of the entire area of the photo are not considered to be significantly related to the whole composition. We will also eliminate such triangles from final detected results. As one can see from FIGS. 6A-6Y, triangles with high continuity ratios are more easily recognized than those with low continuity ratios. However, they do not necessarily outperform those of low continuity ratios in conveying useful compositional information about the photo. For instance, FIG. 6G has a much lower continuity ratio than FIG. 6J but it conveys a more interesting compositional skill. From the detected triangle, we can notice that the model slightly tilts her head to align with her left arm, which constructs a beautiful triangle with her hair. It is very common that multiple different triangles are embedded in one image, and some of them can be easily overlooked by amateurs. Our goal here is to identify all potential triangles from images, which enables amateur photographers to better learn useful compositional techniques.

Figure 7:
FIG. 7 demonstrates that the disclosed detection system can clearly identify presence of triangles in portrait photographs despite the existence of noises such as human hair, props, and shadows/patterns/light folds on shirts and other artifacts.

More detected results can be found in FIG. 7. This demonstrates that our triangle detection system can clearly identify presence of triangles in portrait photographs despite the existence of noises such as human hair, props, and shadows/patterns/light folds on shirts, etc. Moreover, triangles involving multiple human subjects can be accurately detected as well (e.g., fourth picture in the first row and third picture in the second row). More interestingly, our system is able to locate triangles that may not be easy to identify by human eyes. For instance, considering the first photo in the last row, it is quite easy to find the triangle containing the girl's two arms. However, we often overlook another triangle which is constructed with one arm of the girl and the edge of her lower jaw. Another example is the fifth picture in the last row. The girl puts her arm on her dress in a deliberately designed pose so that it extends the boundary of her dress and together with her long hair consists of a big triangle. Both examples indicate that professional photographers usually design delicate poses for the subjects in order to achieve good photo composition. However, choosing a good pose requires much experience and artistic inspiration. The triangles detected by our system can help amateurs gain a deeper understanding and inspirations from high-quality photography works.

Further, to evaluate the performance of the triangle retrieval system, we select 20 groups of representative queries which cover a wide range of angles in terms of magnitude and orientation. We only consider angles in the range of [45°, 135°] because both too small and too big angles are not recognized as triangles. Specifically, each of the 20 groups of queries takes a distinct combination of orientations for two straight lines. Twenty line combinations $(l_1, l_2)$ are selected in our experiment such that the angle between $l_1$ and $l_2$ falls in the closed range of [45°, 135°] and the angle between $l_1/l_2$ and positive x-axis falls in {0°, 22.5°, 45°, 67.5°, 90°, 112.5°, 135°}. Moreover, one combination of two straight lines generates four possible angles which differ in terms of their opening directions. Therefore, four different opening directions are included within each group, namely, upward, downward, leftward, and rightward. We use the 80 queries to retrieve triangles from 4451 photos where each photo may contain many distinct triangles. For each query, we rank the results simply based on their continuity ratios. Higher continuity ratios represent higher quality of fitting and thus imply more accurate retrieved results. That is to say, triangles with higher continuity ratios are less likely to be noise, i.e., the two sides are indeed present in the photos. However, more accurate triangles are not necessarily more "useful" in terms of conveying valuable information about composition. Our goal is to identify as many accurate triangles as possible with the assumption that some of them may provide useful guidance. More work can be done in the future to evaluate and predict the usefulness of a specific triangle. To gain a brief sense about the advantage of our system, we take the top 20 results for each query and evaluate these results by manually labeling whether each result is "useful". More specifically, we check whether a retrieved result conveys information about how professional photographers design the composition of a photo because our system aims at helping amateur users discover such information. It turns out 73.21% of the retrieved results are delivering composition-related information.

Figure 8B:
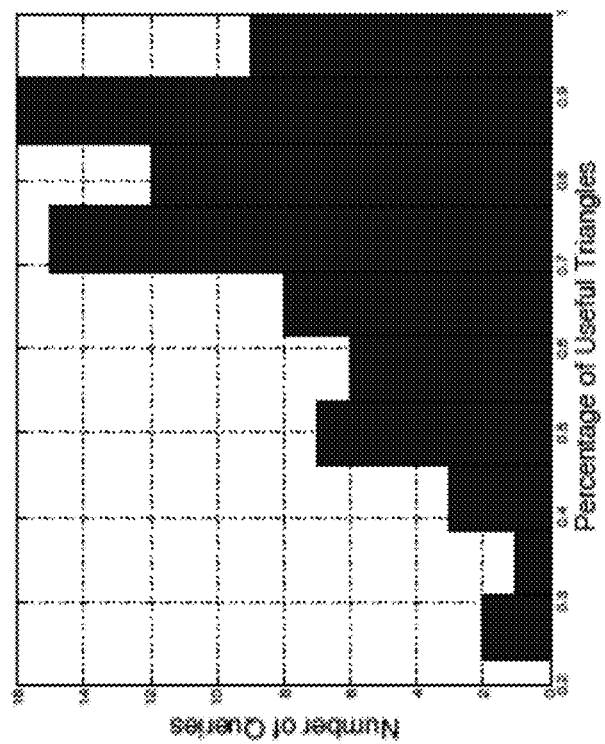
FIG. 8B shows a histogram of performance for 80 queries.
Figure 8A:
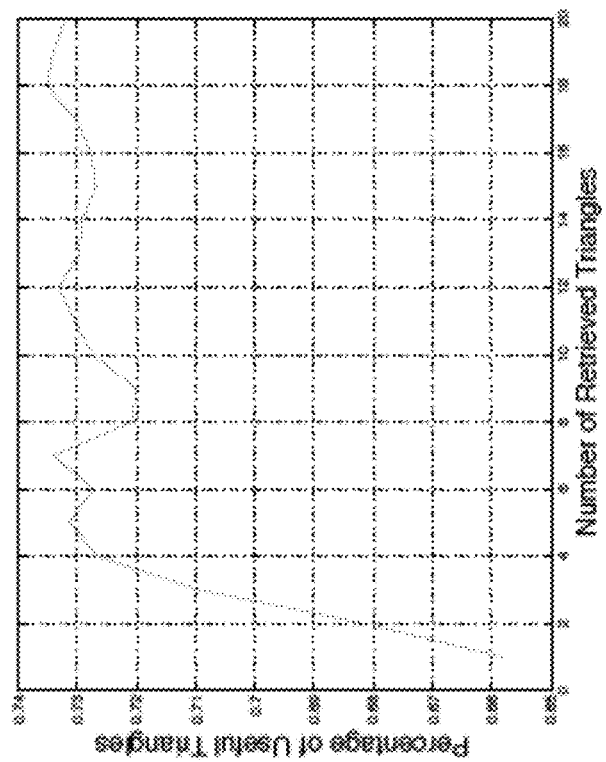
FIG. 8A shows a change of performance when returning different numbers of results.

FIG. 8 shows how the performance of our portrait retrieval system changes as the number of retrieved results increases from 1 to 20. The performance is calculated as the percentage of results that are labeled as "useful" in terms of providing composition-related information. We can notice that the performance of our system is quite stable at 73%. In addition, if we look at the histogram of performance for 80 different queries in FIG. 8(b), it demonstrates that most queries have 70%-90% of retrieved results that can deliver useful information to help amateur users.

Figure 9:
FIG. 9 shows useful and useless examples of retrieved portraits showing results from the same query.

Furthermore, to demonstrate how our system works in more details, we provide examples of both "useful" and "useless" retrieved triangles in FIG. 9. The first column contains twelve queries among which eight return "useful" triangles and four return "useless" triangles. Whether a retrieved triangle is useful depends on whether it provides information about the composition skills of professional photographers. For each query, we only take into account the orientations of two sides and ignore information such as its length and width. It is reasonable because amateur users often do not have a clear idea about how to embed triangles in photos, let alone provide precise description about the triangles they are looking for. This approach enables amateur users to find more diverse triangles and thus can provide users effective suggestions on mastering the triangle composition technique. From the results of our system, we can learn that professional photographers are good at using all kinds of objects, such as arm, leg, shoulder, chair, wall, ground, hair, apparel, or even shadow, to construct triangles. It is worth noticing that slight adjustment of a pose can form beautiful triangles which make the entire composition aesthetically appealing. For instance, the girl in row 3, column 3 slightly turns her head towards left to perfectly align with her shoulder. Amateur users will not pay attention to such details. With our system, they are able to recognize the intricacy of a designed pose. It is due to the same reason that the girl in row 1, column 4 lifts up her head a little bit. Our system also retrieves "useless" triangles for some queries. These triangles seem not to be interesting at all but they also convey useful information. As aforementioned, professional photographers sometimes will avoid 90-degree body angles because it typically looks unnatural and forced. It has been verified by our system that combinations of 0° and 90° sides do not construct aesthetic triangles. It can be seen that although our system can correctly detect 90-degree angles from photos, most of these angles are just noise and do not hold high aesthetic quality.

CONCLUSION

This invention proposes an intelligent system to detect the usage of triangle technique in portrait photography and investigates how it improves the aesthetic quality of photographs. The system first extracts a set of candidate line segments from a photo and then successfully fit a triangle to these segments despite a large proportion of outliers. The fitted result accurately identifies the presence of triangles in photographs. Among a variety of potential applications, we have illustrated how our techniques can provide on-site feedback to photographers.

There are also several directions we can explore to help portrait photographers design and analyze compositions. The relationship between triangles and the aesthetic quality of compositions can be further studied. For instance, how do the number, sizes, shapes, and orientations of triangles influence the aesthetics of photo composition? Answering this question can help amateur photographers learn more specific photography techniques. Moreover, our system can further assist users in shooting photos. Real-time suggestions about pose adjustments can be provided to users to help them embed more appealing triangles in their works.

REFERENCES

[1] P. Arbelaez, M. Maire, C. Fowlkes, and J. Malik. Contour detection and hierarchical image segmentation. *Pattern Analysis and Machine Intelligence, IEEE Transactions on*, 33(5):898-916, 2011.

[2] S. Bhattacharya, R. Sukthankar, and M. Shah. A framework for photo-quality assessment and enhancement based on visual aesthetics. In *Proceedings of the international conference on Multimedia*, pages 271-280. ACM, 2010.

[3] R. Datta, D. Joshi, J. Li, and J. Wang. Studying aesthetics in photographic images using a computational approach. *Computer Vision-ECC V 2006*, pages 288-301, 2006.

[4] R. Datta, J. Li, and J. Z. Wang. Learning the consensus on visual quality for next-generation image management. In *Proceedings of the 15th international conference on Multimedia*, pages 533-536. ACM, 2007.

[5] R. Datta, J. Li, and J. Z. Wang. Algorithmic inferencing of aesthetics and emotion in natural images: An exposition. In *Image Processing, 2008. ICIP 2008. 15th IEEE International Conference on*, pages 105-108. IEEE, 2008.

[6] R. Datta and J. Z. Wang. Acquine: aesthetic quality inference engine-real-time automatic rating of photo aesthetics. In *Proceedings of the international conference on Multimedia information retrieval*, pages 421-424. ACM, 2010.

[7] S. Dhar, V. Ordonez, and T. L. Berg. High level describable attributes for predicting aesthetics and interestingness. In *Computer Vision and Pattern Recognition (CVPR), 2011 IEEE Conference on*, pages 1657-1664. IEEE, 2011.

[8] X. Jin, M. Zhao, X. Chen, Q. Zhao, and S.-C. Zhu. Learning artistic lighting template from portrait photographs. In *Computer Vision-ECCV 2010*, pages 101-114. Springer, 2010.

[9] D. Joshi, R. Datta, E. Fedorovskaya, Q.-T. Luong, J. Z. Wang, J. Li, and J. Luo. Aesthetics and emotions in images. *Signal Processing Magazine, IEEE*, 28(5):94-115, 2011.

[10] Y. Ke, X. Tang, and F. Jing. The design of high-level features for photo quality assessment. In *Computer Vision and Pattern Recognition, 2006 IEEE Computer Society Conference on*, volume 1, pages 419-426. IEEE, 2006.

[11] D. A. Lauer and S. Pentak. *Design Basics (with Art Coursemate with EBook Printed Access Card)*. Wadsworth Publishing Company, 2011.

[12] W. Luo, X. Wang, and X. Tang. Content-based photo quality assessment. In *Computer Vision (ICCV), 2011 IEEE International Conference on*, pages 2206-2213. IEEE, 2011.

[13] Y. Luo and X. Tang. Photo and video quality evaluation: Focusing on the subject. *Computer Vision-ECCV 2008*, pages 386-399, 2008.

[14] M. Nishiyama, T. Okabe, I. Sato, and Y. Sato. Aesthetic quality classification of photographs based on color harmony. In *Computer Vision and Pattern Recognition (CVPR), 2011 IEEE Conference on*, pages 33-40. IEEE, 2011.

[15] P. Obrador, L. Schmidt-Hackenberg, and N. Oliver. The role of image composition in image aesthetics. In *Image Processing (ICIP), 2010 17th IEEE International Conference on*, pages 3185-3188. IEEE, 2010.

[16] R. Orendovici and J. Z. Wang. Training data collection system for a learning-based photographic aesthetic quality inference engine. In *Proceedings of the international conference on Multimedia*, pages 1575-1578. ACM, 2010.

[17] M. Redi and B. Merialdo. Enhancing semantic features with compositional analysis for scene recognition. In *Computer Vision-ECCV 2012. Workshops and Demonstrations*, pages 446-455. Springer, 2012.

[18] H.-H. Su, T.-W. Chen, C.-C. Kao, W. H. Hsu, and S.-Y. Chien. Scenic photo quality assessment with bag of aesthetics-preserving features. In *Proceedings of the 19th ACM international conference on Multimedia*, pages 1213-1216. ACM, 2011.

[19] R. Valenzuela. *Picture Perfect Practice: A Self-Training Guide to Mastering the Challenges of Taking World-Class Photographs*. New Riders, 2012.

[20] R. G. Von Gioi, J. Jakubowicz, J.-M. Morel, and G. Randall. Lsd: a line segment detector. *Image Processing On Line*, 2012.

[21] Y. Zhang, X. Sun, H. Yao, L. Qin, and Q. Huang. Aesthetic composition representation for portrait photographing recommendation. In *Image Processing (ICIP), 2012 19th IEEE International Conference on*, pages 2753-2756. IEEE, 2012.

The invention claimed is:

1. A method of detecting explicit or implicit triangular compositions in photographic images, comprising the steps of:
   receiving a digital photographic image;
   analyzing the received digital photographic image on a programmed computer to extract a set of filtered line segments as candidate triangle sides and/or objects or regions as candidate triangle corners;
   automatically fitting triangles onto
   a) the set of line segments, or
   b) corners, or
   c) the set of line segments and corners to obtain fitting scores; and
   designating the triangles with the highest fitting score as detected triangles in the received digital photographic image.

2. The method of claim 1, wherein the step of automatically fitting triangles onto the set of line segments uses a modified RANSAC algorithm.

3. The method of claim 2, wherein the modified RANSAC algorithm randomly chooses two sides from all the candidates to fit triangles onto the two sides.

4. The method of claim 1, including the step of using local gradient and global contour information to extract the line segments.

5. The method of claim 1, including the step of using continuity ratio and total ratio to evaluate fitness of triangles to determine the fitting scores.

6. The method of claim 1, including the step of presenting triangles with the highest fitting score to users.

7. The method of claim 1, including the step of providing a sketch-based triangle detection framework for portrait-based photographs.

8. The method of claim 7, wherein the framework contains a query module, a line segment detecting module, and an angle fitting module.

9. The method of claim 1, wherein the digital photographic image includes a natural scene.

10. The method of claim 1, wherein the digital photographic image is a portrait.

11. The method of claim 1, including the step of using the detected triangles to model the composition of the received digital photographic image.

12. The method of claim 1, including the steps of:
providing a memory storing a plurality of digital photographic images classified by composition;
using the detected triangles to model the composition of the received digital photographic image; and
comparing the composition of the received digital photographic image to the plurality of stored digital photographic images to classify the composition of the received digital photographic image.

13. The method of claim 1, wherein the step of analyzing the received photographic image to extract a set of filtered line segments includes the steps of:
converting the received digital photographic image into a gradient map;
converting the gradient map into a set of line segments by calculating a level-line angle at each pixel to produce a level-line field, wherein the level-line is a straight line perpendicular to the gradient at each pixel;
partitioning the received digital photographic image into line-support regions by grouping connected pixels that share the same level-line angle up to a predetermined tolerance, wherein each line-support region is a candidate line segment;
approximating each line support region with a rectangle and comparing the number of aligned points in each rectangle in the received digital photographic image with the expected number of aligned points in a random image; and
wherein a line segment is detected if the actual number of aligned points in a rectangle is significantly larger than the expected number.

14. The method of claim 1, wherein the step of automatically fitting triangles onto the set of line segments includes the steps of:
randomly selecting two non-parallel sides from the set; and
defining a triangle by connecting the end points of the two non-parallel sides to find the third side of the triangle, the end points each at the end of one of the two non-parallel sides, such that the two non-parallel sides and the third side of the triangle uniquely determines a triangle.

15. The method of claim 1, wherein the step of automatically fitting triangles onto the set of line segments includes the steps of:
defining a continuity ratio score as a product of a number of projected pixels along each side of a candidate triangle divided by a distance from an intersection point to the farthest projected pixel;
defining a total ratio score as the square root of the area of the triangle divided by the square root of the area of the image; and
retaining only those triangles whose continuity ratio and total ratio scores are both above predetermined thresholds.

16. The method of claim 1, including the step of identifying candidate triangle corners using an object or region segmentation process.

17. The method of claim 1, including the step of identifying candidate triangle corners using a visual saliency evaluation process.

18. The method of claim 1, including the step of identifying candidate triangle corners using a visual feature matching process.

* * * * *